United States Patent [19]
Belsanti

[11] 3,881,455
[45] May 6, 1975

[54] AFTERCOOLER FOR INTERNAL COMBUSTION ENGINE

[75] Inventor: James F. Belsanti, Blue Island, Ill.

[73] Assignee: Allis-Chalmers Corporation, Milwaukee, Wis.

[22] Filed: Oct. 31, 1973

[21] Appl. No.: 411,475

[52] U.S. Cl.......................... 123/119 CD; 123/119 C
[51] Int. Cl............................................. F01p 11/00
[58] Field of Search..... 123/119 CD, 119 C, 119 A; 165/73, 74, 76, 78, 158; 60/599

[56] References Cited
UNITED STATES PATENTS
3,091,228  5/1963  Maxwell...................... 123/119 CD
3,187,810  6/1965  Helin et al. ........................ 165/158

Primary Examiner—Wendell E. Burns
Assistant Examiner—D. Reynolds
Attorney, Agent, or Firm—Arthur L. Nelson

[57] ABSTRACT

An aftercooler in a turbo-charged engine including a removable core having supporting plates at intervals along the length of the core. The periphery of the supporting plates and cooling fins between the plates generally conform to the cross section of the opening of the core supporting housing of the intake manifold. The end walls are sealed to form coolant fluid chambers for fluid flow through fluid passages extending longitudinally through the core while the cooling fins and supporting plates spaced along the length of the intercooler core define cross passages for the flow of the intake air.

10 Claims, 8 Drawing Figures

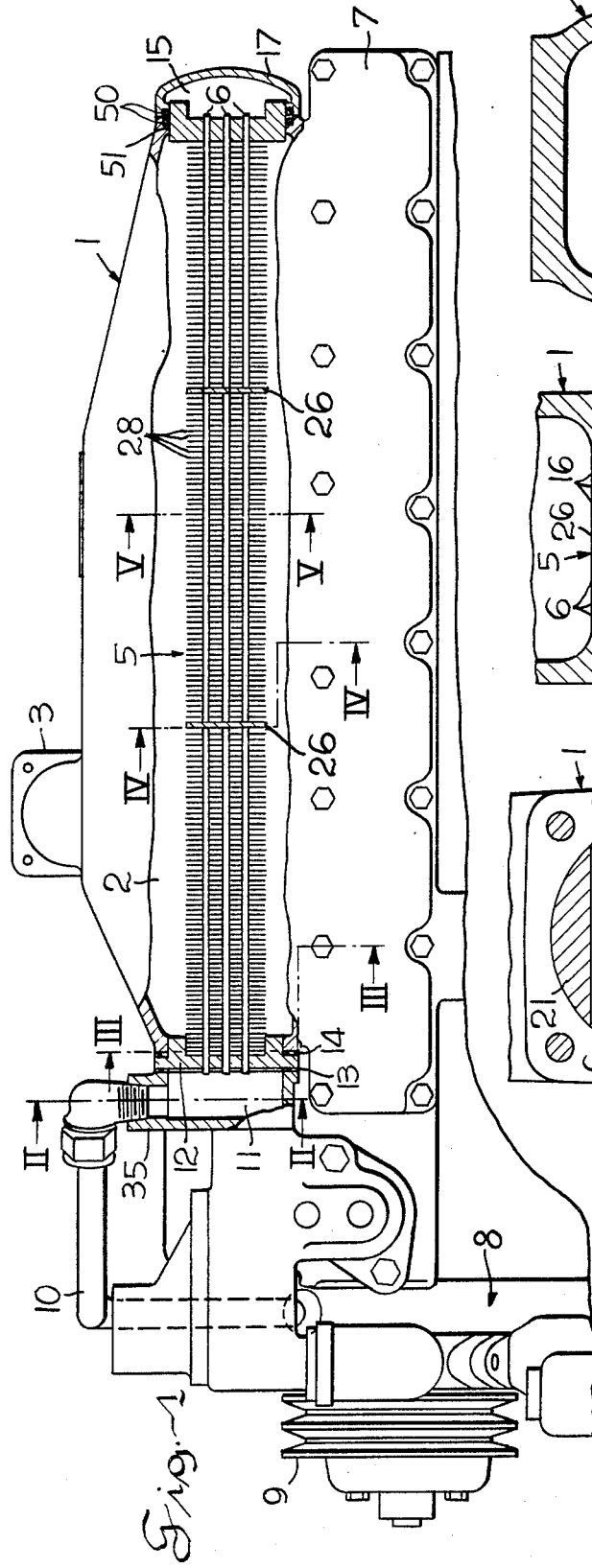

AFTERCOOLER FOR INTERNAL COMBUSTION ENGINE

This invention relates to an aftercooler on a turbocharged engine and more particularly to an aftercooler core having supporting plates and cooling fins spaced along the length of the aftercooler core. The plates engage a complementary supporting housing of the intake manifold and the cooling fins embrace the fluid conduits and generally conform to the shape of the supporting plates which are received within the intake manifold walls which provide the supporting structure for the aftercooler core.

Supercharged engines include some form of supercharging device such as a blower or a turbocharger which compresses air as it is supplied to the engine. As air is compressed it becomes heated. Since air will occupy less volume if it is cooled, aftercoolers are employed to cool the air before it is transferred to the engine cylinders. In the case of two-stage turbocharging the intercooler cools the air before it is supplied to the second compressor to increase the weight of air supplied for charging the combustion chamber. The aftercooler or the intercooler, whichever may be used, is essentially a heat exchanger in which a coolant fluid is passed through the heat exchanger to absorb heat from the incoming air which is transmitted to the combustion chamber. It is conventional to use baffles to deflect the flow of the incoming air supplied to the engine cylinders. It is also conventional to use lateral flanges and gaskets or sealing arrangements of such type to seal the connections between the intercooler core and the intake manifold. This type of an arrangement requires additional components at added expense which is unnecessary. Accordingly, this invention provides for an intercooler core or an aftercooler core which can be readily inserted longitudinally within an intake manifold and carries its own supporting means on the core per se. The end of the core is sealed to provide flow of coolant fluid longitudinally through the core. The length of the core is supported by transverse plates which have a peripheral configuration complementary to the lateral walls of the intake manifold. The cooling fins are positioned intermediate the supporting plates and are generally the same configuration as the supporting plates but of slightly smaller size so that the supporting plates carry the weight of the aftercooler core while the cooling fins merely direct the air transversely through the intake manifold as it is supplied to the combustion chambers of the engine.

It is an object of this invention to provide a removable aftercooler core with the manifold walls providing lateral air passages and the cooling fins extending transversely between the walls to form cross passages the length of the core.

It is another object of this invention to provide an aftercooler core and an intake manifold on an internal combustion engine with supporting plates complementary with the intake manifold housing for supporting the core along the length of the manifold.

It is another object of this invention to provide an aftercooler core with cooling fins and support plates embracing the fluid coolant passages and forming the supporting structure for the aftercooler core along the length of the core.

It is another object of this invention to provide an intercooler core for an intake manifold with longitudinal fluid conduits and providing cross flow air passages between cooling fins and supporting plates extending the length of the intake manifold.

The objects of this invention are accomplished by providing an aftercooler core with longitudinal hydraulic fluid conduits. The core is inserted endwise through an opening in the intake manifold and is provided with a sealed chamber on each end for hydraulic fluid which flows through the intercooler. Intermediate the two hydraulic fluid chambers are transversely mounted supporting plates and cooling fins which are complementary to the configuration of the supporting walls in the intake manifold. The supporting plates are slightly larger in size than the cooling fins to provide a support for the aftercooler core when it is mounted in the manifold.

Referring to the drawings the preferred embodiments are illustrated;

FIG. 1 illustrates a side elevation view of a portion of the internal combustion engine with a portion of the intake manifold broken away to show the aftercooler core;

FIG. 2 is a cross-section view taken on line II—II of FIG. 1;

FIG. 3 is a cross-section view taken on line III—III of FIG. 1;

FIG. 4 is a cross-section view taken on line IV—IV of FIG. 1;

FIG. 5 is a cross-section view taken on line V—V of FIG. 1;

Figure 6:
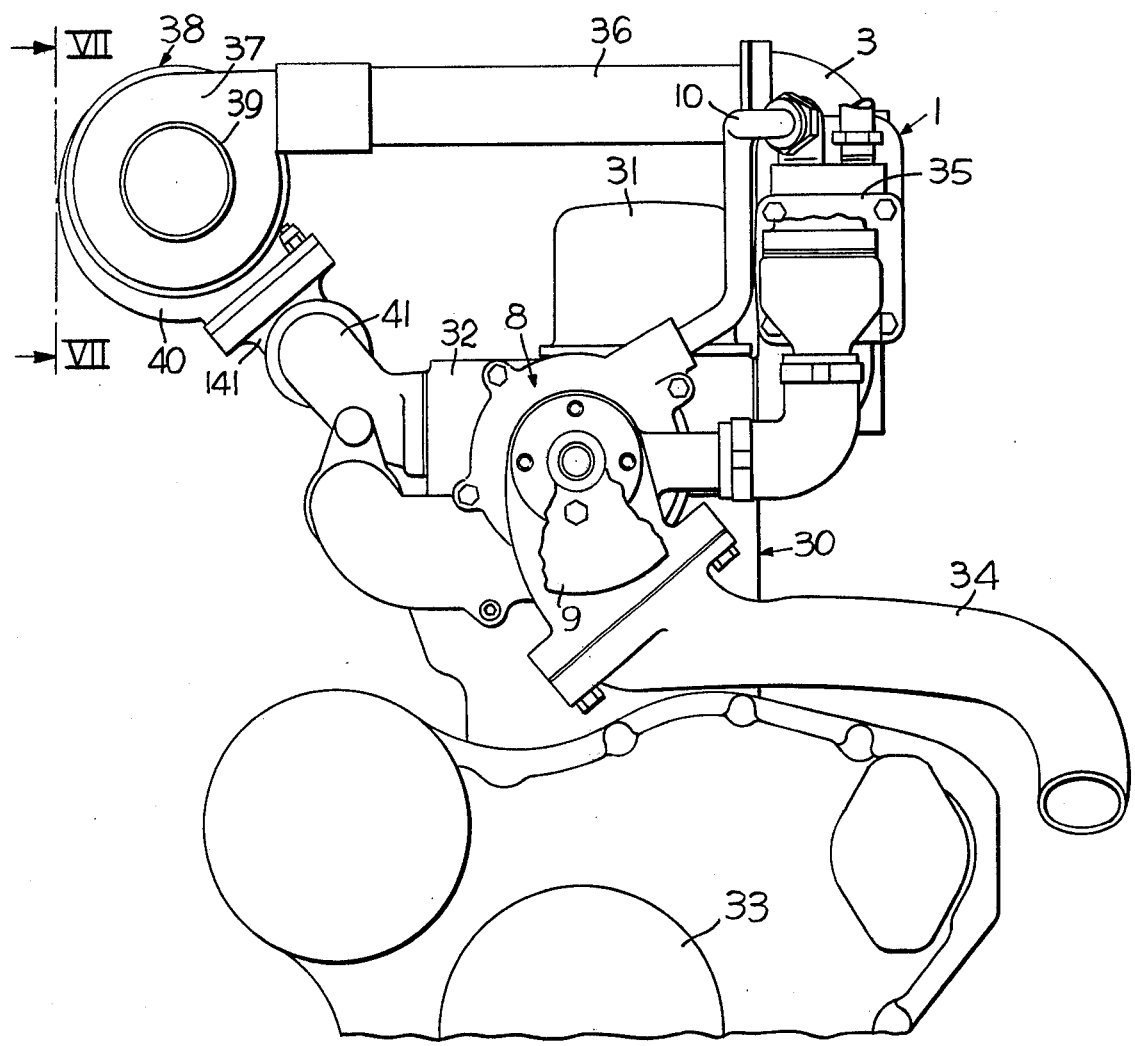
FIG. 6 is an end view of the engine showing the turbocharger and aftercooler on an engine.
Figure 7:
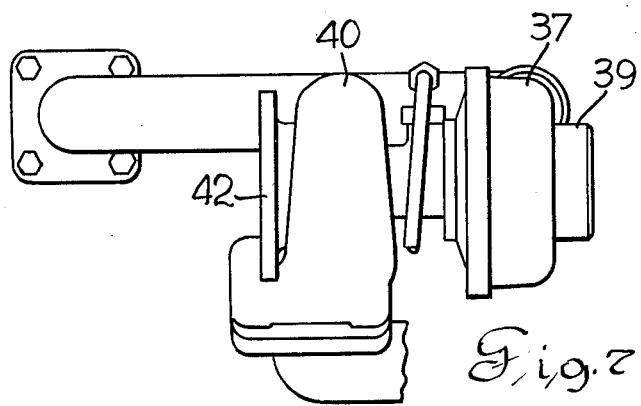
FIG. 7 is a fragmentary view taken on line VII—VII of FIG. 6.

Referring to the drawings a portion of the internal combustion engine is shown in FIG. 1. The engine shown in FIG. 1 is a straight six engine. FIG. 1 shows a side view of the engine in which the intake manifold 1 forms a supercharger air delivery chamber 2. The supercharger is connected to air inlet connection 3. The intake manifold 1 includes an intermediate portion forming an aftercooler core support section 4. The core 5 is mounted within the aftercooler core support section 4 and will be described subsequently. Air delivered to the chamber 2 passes around the coolant fluid conduits 6 and 16 and is discharged in the intake chamber 7 which is in communication with a plurality of cylinder intake passages. These passages are shown in subsequent section views of this portion of the engine.

A cooling pump 8 is driven by a V-belt pulley 9 which in turn is driven from a drive pulley on the end of the crankshaft. The cooling pump 8 delivers coolant fluid through the discharge pipe 10 which in turn delivers the coolant fluid to the inlet coolant fluid chamber 11. The inlet coolant fluid chamber 11 supplies the coolant fluid to the plurality of conduits 6 in the aftercooler core 5. The coolant fluid chamber 11 is sealed from the supercharger delivery chamber 2 by means of the partition 12 which is seated between the two seals 13 and 14 and fastened by suitable fastening means to the end of the intake manifold 1.

The coolant fluid conduit 6 of the aftercooler core 5 discharges into the end coolant fluid chamber 15 from which fluid is returned through the plurality of conduits 16 on the opposite side of the aftercooler core 5. The end cap 17 is fastened on the end of the intake manifold 1 by suitable fastening means. The right hand end of the aftercooler core 5 is sealed by seals 50 received in recesses in the end cap 17 and manifold which engages the external periphery 51 from the aftercooler core to seal the chamber 15.

FIG. 2 is a cross section view showing the inlet coolant fluid chamber 11 connected to conduits 6 and the return coolant fluid chamber 18 which receives fluid from the conduits 16. The center partition 19 separates the two chambers 11 and 18. The return conduit 20 returns coolant fluid from the aftercooler core 5 to the cooling system for recirculation.

FIG. 3 is a cross section view of the end of the intake manifold 1 with the supporting structure 21 on the end of the aftercooler core 5 supported within the end 22 of the intake manifold 1. The passage 23 supplies intake air to one of the combustion chambers in the cylinders in the internal combustion engine.

FIG. 4 illustrates a cross section view in which the aftercooler core 5 is shown supported in the side walls 24 and 25 of the intake manifold 1. The support plate 26 embraces the fluid conduits 6 and 16 and forms a support for the aftercooler core 5 in the position shown on the intake manifold. A plurality of support plates 26 are spaced at intervals along the length of the aftercooler core to provide support between the ends of the aftercooler core 5. The passage 27 is in communication with a cylinder in the internal combustion engine.

The cross section view of FIG. 5 shows the aftercooler core 5 mounted in intake manifold 1. The cooling fins 28 embrace a plurality of conduits 6 and 16 and provide cooling of the air as the intake air passes from the supercharger and the air delivery chamber 2 to the passage 29 which delivers intake air to one of the combustion chambers in a cylinder of the engine. The cooling fin 28 is of slightly smaller peripheral size than the support plate 26 shown in FIG. 4 and does not provide any support for the aftercooler core. The cooling fin 28 is substantially thinner than the support plate 26. However, its periphery is close to the walls 24 and 25 thereby causing the air to flow around the conduits 6 and 16 in passing through the aftercooler core 5 as it is transmitted from the chamber 2 to the passage 29.

FIG. 6 is an end view of the engine shown in the previous five figures. The engine 30 is an in-line engine with a cylinder head 31 on the block 32 connected to a crankcase which carries the crankshaft for driving the drive pulley 33. The hose connection 34 is adapted for connection to the lower end of the radiator for the engine. Pulley 9 is driven by a belt drive from the drive pulley 33. A coolant pump 8 supplies the fluid through the pipe 10. A thermostatic valve is contained within the valve chamber 35 for controlling the fluid flow through the radiator or through the engine in response to temperature of the coolant fluid. The return conduit returns coolant fluid from the aftercooler to the return side of the coolant system of the engine.

The cross conduit 36 transmits intake air from the compressor 37 of the turbocharger unit 38. The pipe 39 is adapted for connection through an air filter to receive clean air for supplying the engine with air for combustion.

The turbine 40 is driven by exhaust gas from exhaust manifold 41. Exhaust gas from the turbine 40 is exhausted through the exhaust pipe 42.

Figure 8:
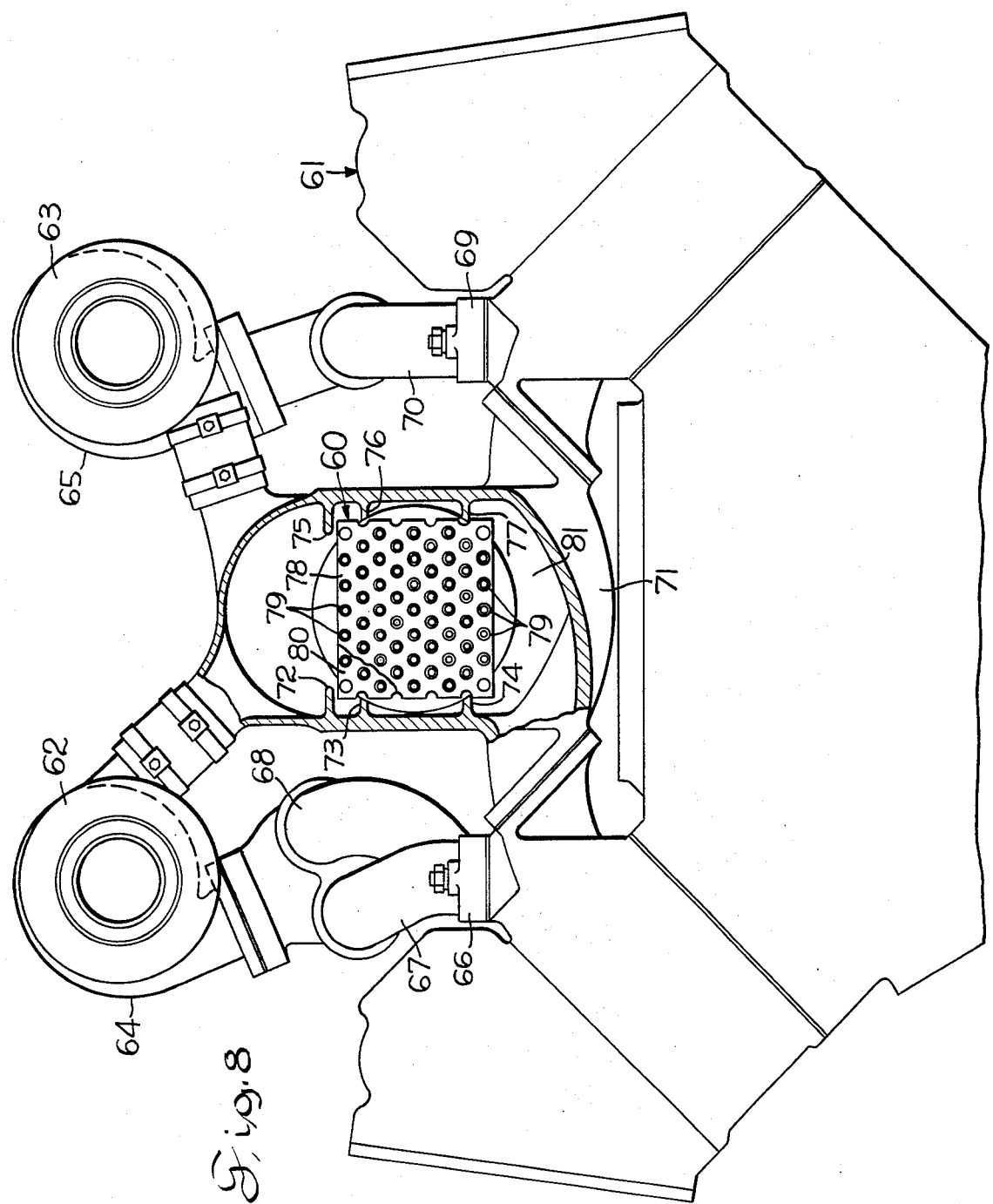
FIG. 8 is a modification of the invention showing the aftercooler core on a V-8 engine.

FIG. 8 shows an aftercooler core 60 for a V-8 engine 61. The V-8 engine includes compressors 62 and 63 driven by turbines 64 and 65. The turbine 64 is driven from exhaust manifold 66 transmitted through the exhaust pipes 67 and 68 to the turbine 64. In a like manner, the exhaust manifold 69 delivers exhaust gas through the exhaust pipe 70 to the turbine 65. The aftercooler for the V-8 engine shown in FIG. 8 operates essentially the same as the aftercooler shown for the straight six engine. However, the periphery of the core 60 is mounted slightly different in the intake manifold 71. Manifold 71 forms the partitions 72, 73, 74 as well as the partitions 75, 76, 77 which engage edges of a supporting plate 78. The support plate 78 embraces a plurality of conduits 79 in the aftercooler core 60. A plurality of fins 80 are spaced between the plates 78 for cooling of the intake air delivered from the compressor 62 and 63 into the air delivery chamber 79.

As intake air passes from the chamber 79 into the chamber 81 it is cooled by the aftercooler core 60. The air is forced to pass through the aftercooler core 60 and cannot pass around the partition ends that support plate 78.

The operation of the aftercooler will be described in the following paragraph.

When the engine is in operation exhaust gas from the exhaust manifold 41 is delivered to the exhaust pipe 141 to the turbine 40. The turbine 40 drives the compressor 37 and compresses air received from the inlet pipe 39 which delivers air through the cross conduit 36. Cross conduit 36 is connected to the supercharger air delivery chamber 2 in intake manifold 1. The intake air then passes around the cooling fins of the aftercooler core 5 which is supported by the plates 26. The air is cooled as it is delivered to the passages 23, 27 and 29 before it is delivered to the combustion chambers in the cylinders of the engine. Accordingly, a larger charge of air is delivered to the engine.

The intake manifold is provided with seals 50 in an internal annular groove of intake manifold 1 and end cap 17. The seals engage a periphery 51 of the right-hand end of the intake manifold and seals the chamber 15 for the coolant fluid. The left-hand end of the aftercooler 45 is mounted in the left-hand end of the manifold 1 and sealed by means of seals 13 and 14. Suitable fastening means firmly seat the valve housing 35 against the seals compressing the seals to seal the chamber 2 from the external side of the manifold as well as the chambers 11 and 18 for the inlet and return of the coolant fluid.

The coolant fluid is circulated through the intercooler core by the coolant pump 8. The coolant fluid pump 8 pumps the fluid into the inlet coolant fluid chamber 11 and from here the coolant fluid passes through the conduits 6 to the chamber 15 in the opposite end of the manifold 1. Coolant fluid from chamber 15 is then returned through the conduits 16 to the return coolant fluid chamber 18 and then back to the coolant fluid system. The only seals required of the core 5 of the aftercooler are the seals in the right-hand end which can be conveniently positioned in the intake manifold and the two gaskets 13 and 14 of the left-hand end which are fastened when the aftercooler core is positioned in the intake manifold 1. The core is supported on each end by a sealed structure as shown as well as at intervals along the length of the core on the lateral walls 24 and 25 of the intake manifold.

The embodiments of the invention in which an exclusive property or privilege is claimed are defined as follows.

1. An internal combustion engine having at least one cylinder comprising, an intake manifold including means defining a supercharger air discharge chamber for receiving air from a supercharger, an intake passage communicating with said cylinder, a core supporting section intermediate said air delivery chamber and said intake passage including manifold core supporting walls defining inner surfaces, an aftercooler core including a plurality of fluid conduits extending the length of said manifold, a plurality of core supporting plates embracing said plurality of conduits and defining peripheral surfaces for engaging the inner surfaces of said manifold core supporting walls of said intake manifold, a plurality of cooling fins interleaved between said supporting plates forming cooling air passages through said aftercooler core, means defining coolant fluid chambers at the ends of said aftercooler core for circulating coolant fluid through said core for cooling of intake air supplied to said internal combustion engine.

2. An internal combustion engine having at least one cylinder as set forth in claim 1 wherein said core supporting walls of said intake manifold define arcuate surfaces for engaging said supporting plates of said aftercooler core.

3. An internal combustion engine having at least one cylinder as set forth in claim 1 including means defining an inlet coolant fluid chamber and a return coolant fluid chamber on the ends of said intake manifold for supplying coolant fluid for the aftercooler core.

4. An internal combustion engine having at least one cylinder as set forth in claim 1 wherein said supporting plates define substantially configuration, a plurality of partition ends on said core supporting walls of said intake manifold for supporting said aftercooler core.

5. An internal combustion engine having at least one cylinder as set forth in claim 1 wherein said aftercooler core supporting walls of said intake manifold define smooth peripheral surfaces, said supporting plates of said aftercooler core define complementary smooth edges for engaging said walls of said intake manifold for supporting said aftercooler core.

6. An internal combustion engine having at least one cylinder as set forth in claim 1 wherein said supporting plates of said aftercooler core define peripheral surfaces complementary to the core supporting walls of said intake manifold for engaging said walls, said fins define complementary peripheral edges slightly smaller than the supporting plates.

7. An internal combustion engine having at least one cylinder as set forth in claim 1 wherein said internal combustion engine comprises an in-line bank of cylinders.

8. An internal combustion engine having at least one cylinder as set forth in claim 1 wherein said internal combustion engine comprises a V-8 engine.

9. An internal combustion engine having at least one cylinder as set forth in claim 1 wherein said aftercooler core defines a removable core including an end plate and sealing means forming one of said coolant fluid chambers on one end of said aftercooler core and a second end plate and sealing means on the opposite end of said aftercooler core forming a second coolant fluid chamber.

10. An internal combustion engine having at least one cylinder as set forth in claim 1 wherein said aftercooler core defines peripheral surfaces on the supporting plates adapted for slidably positioning said aftercooler core within said intake manifold.

* * * * *

UNITED STATES PATENT OFFICE
CERTIFICATE OF CORRECTION

Patent No. 3,881,455　　　　　　　Dated May 6, 1975

Inventor(s) James F. Belsanti

It is certified that error appears in the above-identified patent and that said Letters Patent are hereby corrected as shown below:

Column 5, line numbered 35, after "substantially"

insert --- square ---.

Signed and Sealed this eleventh Day of May 1976

[SEAL]

Attest:

RUTH C. MASON
Attesting Officer

C. MARSHALL DANN
Commissioner of Patents and Trademarks